United States Patent
Lin et al.

(10) Patent No.: US 8,922,534 B2
(45) Date of Patent: Dec. 30, 2014

(54) SYSTEM FOR DISPLAY IMAGES AND FABRICATION METHOD THEREOF

(75) Inventors: Ming-Chang Lin, Miao-Li County (TW); Chih-Wei Ho, Miao-Li County (TW); Ching-Hung Teng, Miao-Li County (TW); Te-Hung Peng, Miao-Li County (TW); Chao-Yi Hung, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 231 days.

(21) Appl. No.: 13/542,940

(22) Filed: Jul. 6, 2012

(65) Prior Publication Data
US 2013/0016077 A1 Jan. 17, 2013

(30) Foreign Application Priority Data

Jul. 12, 2011 (TW) .............................. 100124558 A

(51) Int. Cl.
*G09G 5/00* (2006.01)
*G02F 1/1362* (2006.01)

(52) U.S. Cl.
CPC .... *G02F 1/136227* (2013.01); *G02F 1/136286* (2013.01)
USPC ........... 345/204; 345/205; 345/207; 345/209; 345/211; 345/212

(58) Field of Classification Search
CPC ................. G09G 3/00; G09G 3/3648; G09G 2300/0426; G02F 1/136286; G02F 1/136227
USPC .......... 345/55, 82–92, 204–212, 590; 257/59, 257/72; 438/34; 349/33–48
See application file for complete search history.

(56) References Cited

U.S. PATENT DOCUMENTS

| | | | |
|---|---|---|---|
| 7,582,903 B2 * | 9/2009 | Hong et al. | 257/72 |
| 8,085,232 B2 * | 12/2011 | Joo et al. | 345/96 |
| 2004/0124869 A1 * | 7/2004 | Lee et al. | 324/770 |
| 2004/0169781 A1 * | 9/2004 | Lee et al. | 349/54 |

(Continued)

FOREIGN PATENT DOCUMENTS

| | | |
|---|---|---|
| TW | 396370 | 7/2000 |
| TW | 201116911 A1 | 5/2011 |

OTHER PUBLICATIONS

TW Office Action dated May 27, 2014.

(Continued)

*Primary Examiner* — Prabodh M Dharia
(74) *Attorney, Agent, or Firm* — McClure, Qualey & Rodack, LLP

(57) ABSTRACT

A system for displaying images including a display panel and a fabrication method thereof are provided. The method includes forming a first gate line and a second gate line at each row of pixels of the display panel, wherein the first gate lines and the second gate lines are separated and electrically isolated from each other. A first insulating layer is formed to cover the first gate lines and the second gate lines, and a plurality of via holes are formed in the first insulating layer to expose the first gate lines and the second gate lines. Then, a first conductive pattern is formed on the first insulating layer, such that the first gate line at each row of the pixels is electrically connected to the second gate line at an adjacent row of the pixels, by the first conductive pattern, through the via holes.

20 Claims, 14 Drawing Sheets

(56) References Cited

U.S. PATENT DOCUMENTS

| | | | |
|---|---|---|---|
| 2004/0257487 A1* | 12/2004 | Lee et al. | 349/43 |
| 2005/0231455 A1* | 10/2005 | Moon | 345/89 |
| 2005/0275609 A1* | 12/2005 | Lee et al. | 345/82 |
| 2006/0139543 A1* | 6/2006 | Kim et al. | 349/141 |
| 2007/0040956 A1* | 2/2007 | Shin et al. | 349/50 |
| 2007/0063233 A1* | 3/2007 | Joo et al. | 257/291 |
| 2007/0097072 A1* | 5/2007 | Kim et al. | 345/103 |
| 2007/0164964 A1* | 7/2007 | Ha | 345/98 |
| 2008/0123038 A1* | 5/2008 | Suwa et al. | 349/129 |
| 2009/0128533 A1* | 5/2009 | Tsubata | 345/209 |
| 2009/0256832 A1* | 10/2009 | Ding | 345/211 |
| 2010/0033470 A1* | 2/2010 | Lee et al. | 345/212 |
| 2010/0053530 A1* | 3/2010 | Peng et al. | 349/139 |
| 2010/0219414 A1* | 9/2010 | Kim | 257/71 |
| 2011/0115998 A1* | 5/2011 | Liao et al. | 349/38 |
| 2011/0175533 A1* | 7/2011 | Holman et al. | 315/130 |
| 2011/0215260 A1* | 9/2011 | Kleinwaechter et al. | 250/492.1 |
| 2011/0242468 A1* | 10/2011 | Choi et al. | 349/129 |

OTHER PUBLICATIONS

English Abstract translation of TW396370 (Published Jul. 1, 2000).

* cited by examiner

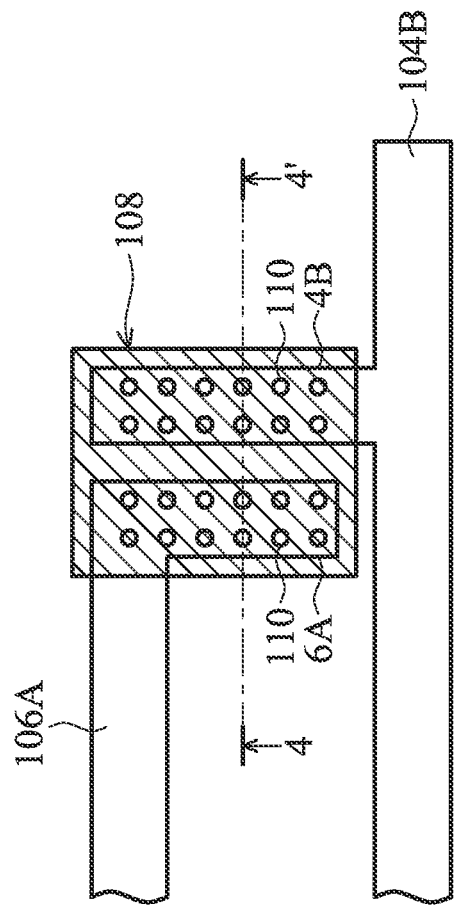

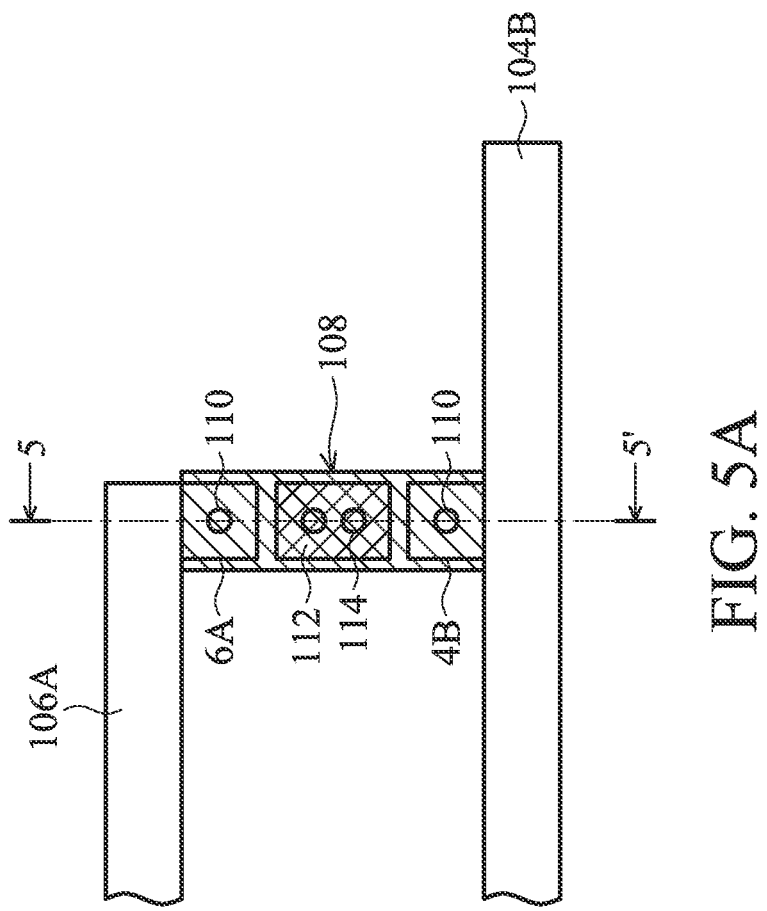

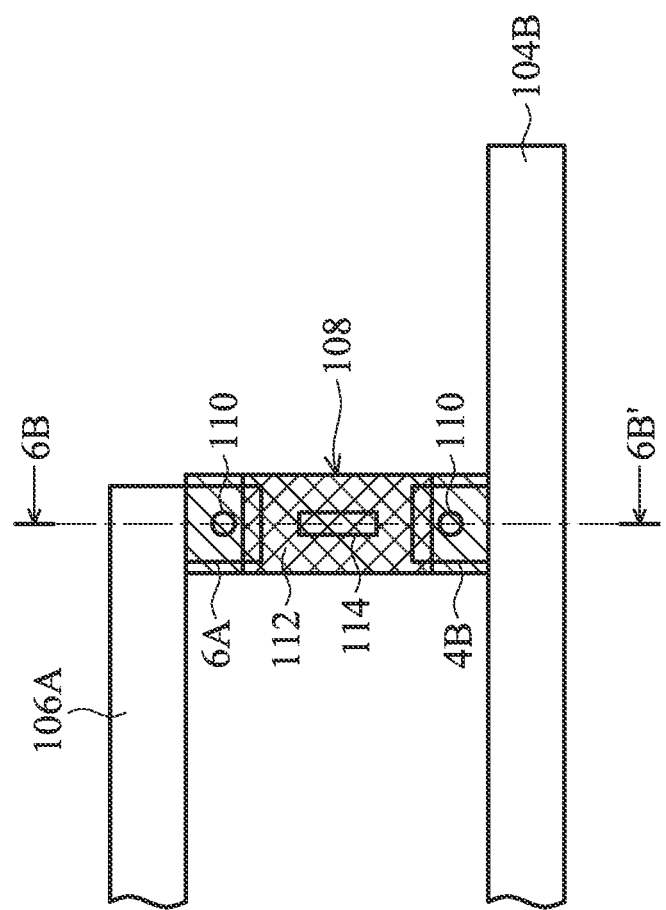

SYSTEM FOR DISPLAY IMAGES AND FABRICATION METHOD THEREOF

CROSS REFERENCE TO RELATED APPLICATIONS

This Application claims priority of Taiwan Patent Application No. 100124558, filed on Jul. 12, 2011, the entirety of which is incorporated by reference herein.

BACKGROUND OF THE INVENTION

1. Field of the Invention

The invention relates to a system for displaying images including a display panel, and more particularly to a design for gate lines of a liquid crystal display panel using charge sharing technology.

2. Description of the Related Art

Charge sharing technology is one kind of wide viewing angle technology, which is widely used in liquid crystal display panels. Charge sharing technology requires providing a same gate signal input to two gate lines. One gate line is disposed at a major area of a pixel at a row for transmitting a gate signal input to a driving thin film transistor at the pixel. Another gate line is disposed at a secondary area of a pixel at a front row adjacent to the row with the pixel having the one gate line. Another gate line is used for transmitting a gate signal input to a step-down thin film transistor at the pixel of the front row. If one of the two gate lines fails, horizontal bright or dark lines will appear on the displayed images to reduce the display quality.

In the current processes of liquid crystal display panels, two gate lines for transmitting the same gate signal input are connected together after a photolithography and an etching process. When an open-short test is performed to check the gate lines and one of the two gate lines is broken, an electrical testing signal input still can be transmitted by the other gate line. Thus, the open problem of the broken gate line is not found. After the fabrication of the liquid crystal display panel is complete, the open defect of the gate line can be found.

The open defect of the gate lines cannot be found before the fabrication of the liquid crystal display panel is complete according to the conventional design for gate lines using charge sharing technology. Thus, much liquid crystal display panels are scrapped or display quality of the liquid crystal display panels are poor according to the conventional design for gate lines using charge sharing technology.

BRIEF SUMMARY OF THE INVENTION

Accordingly, embodiments of the invention provide a method of fabricating a system for displaying images including forming a display panel. The method can overcome the above mentioned problem of the conventional design for gate lines using charge sharing technology. Before the fabrication of the liquid crystal display panel is complete, the open defect of the gate line is found. Thus, the method can prevent the liquid crystal display panels from being scrapped due to find open and short defects of gate lines before assembly of the liquid crystal display panels and the display quality of the liquid crystal display panels is enhanced.

According to an embodiment, a method of fabricating a system for displaying images including forming a display panel is provided. The display panel has a plurality of pixels. The method comprises forming a first gate line and a second gate line at each row of the pixels, wherein each of the first gate lines and each of the second gate lines are separated and electrically isolated from each other. A first insulating layer is formed to cover the first gate lines and the second gate lines. A plurality of via holes is formed in the first insulating layer to expose the first gate lines and the second gate lines separately. Then, a first conductive pattern is formed on the first insulating layer, wherein the first gate line at each row of the pixels is electrically connected to the second gate line at an adjacent row of the pixels, by the first conductive pattern, through the via holes.

According to an embodiment, a system for displaying images including a display panel is provided. The display panel has a plurality of pixels and the display panel comprises a first gate line and a second gate line disposed at each row of the pixels, wherein each of the first gate lines and each of the second gate lines are separated from each other. A first insulating layer is disposed over the first gate lines and the second gate lines. A plurality of via holes is disposed in the first insulating layer to expose the first gate lines and the second gate lines separately, and a first conductive pattern is disposed on the first insulating layer, wherein the first gate line at each row of the pixels is electrically connected to the second gate line at an adjacent row of the pixels, by the first conductive pattern, through the via holes.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein:

FIG. 4A shows an enlarged plane view at the circle area E of FIG. 1 according to an embodiment of the invention;

FIG. 5A shows an enlarged plane view at the circle area E of FIG. 1 according to an embodiment of the invention;

FIG. 6A shows an enlarged plane view at the circle area E of FIG. 1 according to an embodiment of the invention;

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In embodiments of the invention, during a photolithography and an etching process of an array substrate of a display panel, firstly, two gate lines used for transmitting a same gate signal input are electrically isolated from each other. An open-short test is performed to the gate lines to find electrically abnormal gate lines for repairing. Then, a first gate line at each row of pixels of the display panel is electrically connected to a second gate line at an adjacent row of the pixels by another conductive layer to achieve the objective of the charge sharing.

Figure 1:
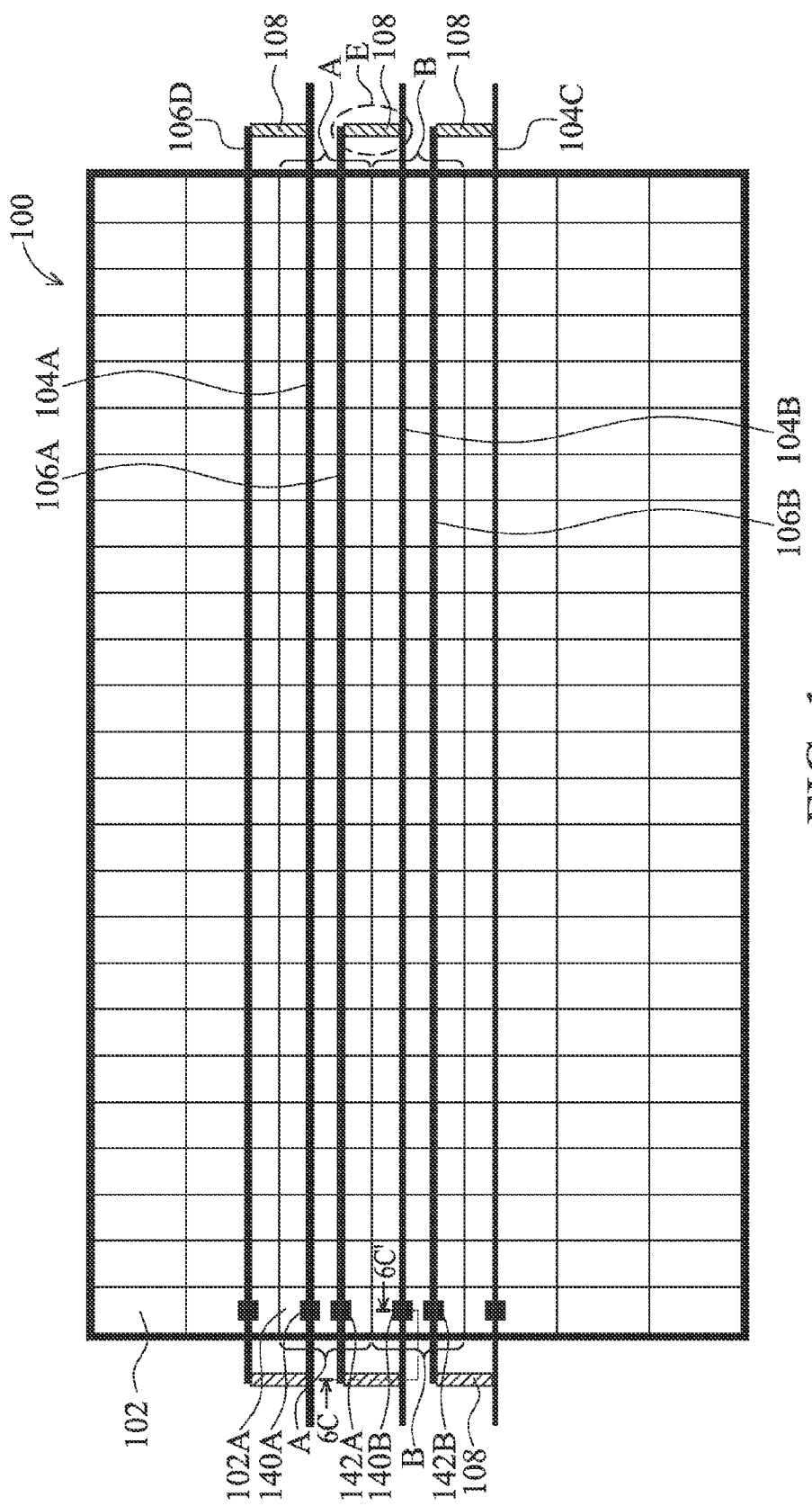
FIG. 1 shows a schematic plane view of a layout of gate lines of a display panel according to an embodiment of the invention.

Referring to FIG. 1, a plane view of a layout of gate lines of a display panel 100 according to an embodiment of the invention is shown. The display panel 100 has a plurality of pixels 102. The pixels 102 are arranged by a plurality of rows and a plurality of columns. Two gate lines are disposed at each row of the pixels. For example, an A row of the pixels has two gate lines and a B row of the pixels has two gate lines. The two gate lines at the A row are a first gate line 104A and a second gate line 106A. The two gate lines at the B row are a first gate line 104B and a second gate line 106B. Moreover, each pixel 102 has at least two thin-film transistors. For example, one pixel 102A at the A row has a driving thin-film transistor 140A and a step-down thin film transistor 142A for the pixel 102A. One pixel at the B row has a driving thin-film transistor 140B and a step-down thin film transistor 142B for the pixel. A gate of the driving thin-film transistor 140A for the pixel 102A receives a gate signal transmitted from the first gate line 104A. A gate of the step-down thin film transistor 142A for the pixel 102A receives a gate signal transmitted from the second gate line 106A.

According to the embodiments of the invention, each gate line formed by the photolithography and the etching process, such as the first gate lines 104A, 104B and 104C and the second gate lines 106D, 106A and 106B, is separated and electrically isolated from each other. Next, an open-short test is performed to each gate line and then a repairing process is performed to electrically abnormal gate lines. Then, as shown in FIG. 1, the first gate line at each row of the pixels is electrically connected to the second gate line at an adjacent row of the pixels by a first conductive pattern 108. For example, the first gate line 104A at the A row of the pixels is electrically connected to the second gate line 106D at a preceding row of the pixels adjacent to the A row by the first conductive pattern 108. Thus, the first gate line 104A and the second gate line 106D receive the same gate signal. Similarly, the first gate line 104B at the B row of the pixels is electrically connected to the second gate line 106A at the A row of the pixels by another first conductive pattern 108 for receiving the same gate signal. According to the embodiments of the invention, the left side and the right side of the display panel 100 both have a plurality of the first conductive patterns 108, which are used for electrically connecting the first gate line at each row of the pixels with the second gate line at an adjacent row of the pixels.

In the pixel 102, a gate of the driving thin-film transistor 140A receives the gate signal transmitted from the first gate line 104A to turn on the driving thin-film transistor 140A. A gate of the step-down thin film transistor 142A receives the gate signal transmitted from the second gate line 106A to turn on the step-down thin film transistor 142A. Because the first gate line 104B is at the next row of the second gate line 106A, i.e., the B row of the pixels receive the same gate signal, in the pixel 102, turning on of the step-down thin film transistor 142A is slower than that of the driving thin-film transistor 140A to achieve the objective of the charge sharing technology.

Figure 2:
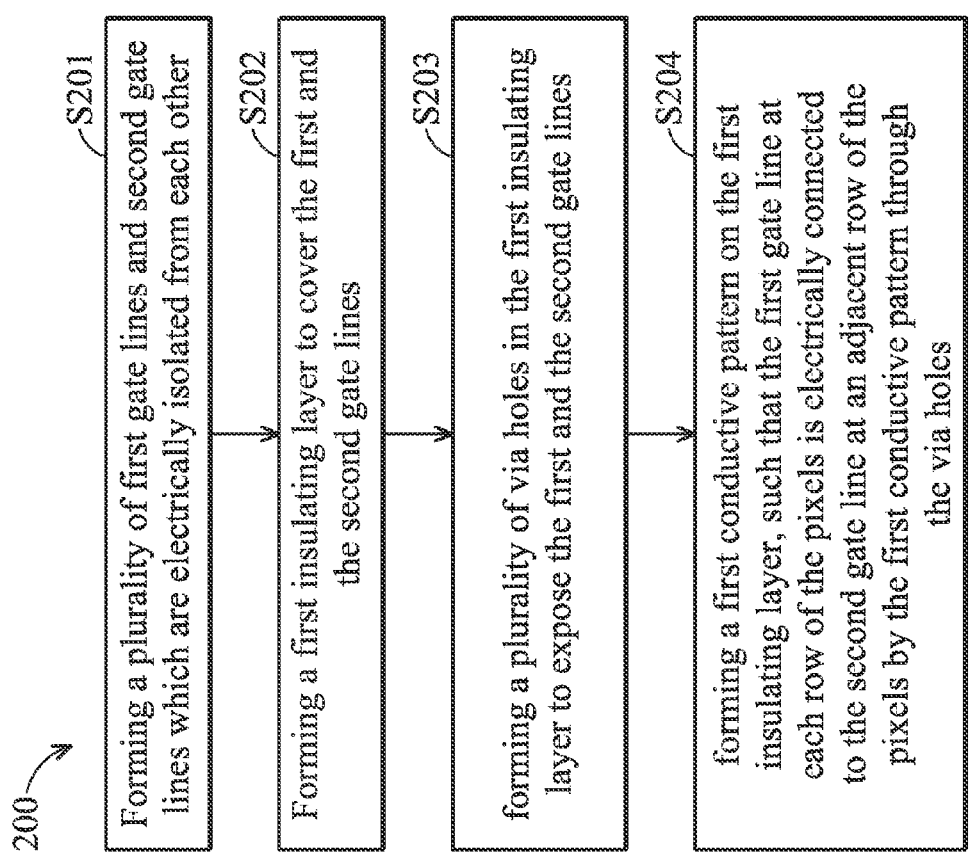
FIG. 2 shows a flow chart of a method of fabricating a system for displaying images including the display panel according to an embodiment of the invention.

Referring to FIG. 2, a flow chart of a method 200 of fabricating a system for displaying images including the display panel 100 according to an embodiment of the invention is shown. At the step 201, a plurality of first gate lines and a plurality of second gate lines as shown in FIG. 1 are formed on an array substrate of the display panel 100. These first and second gate lines are separated and electrically isolated from each other. Meanwhile, an open-short test is performed to the first and second gate lines. If any electrically abnormal gate line is found, a repairing process is performed to the electrically abnormal gate line immediately.

At the step S202, an insulating layer is formed over the first and second gate lines. Next, at the step S203, a plurality of via holes is formed in the insulating layer to expose the first and second gate lines.

Then, at the step S204, a first conductive pattern is formed on the insulating layer, such that the first gate line at each row of pixels is electrically connected to the second gate line at an adjacent row of the pixels by the conductive layer through the via holes. As shown in FIG. 1, the first gate line 104B at the B row of the pixels is electrically connected to the second gate line 106A at an adjacent preceding row, i.e., the A row of the pixels, by the first conductive pattern 108.

Figure 3A:
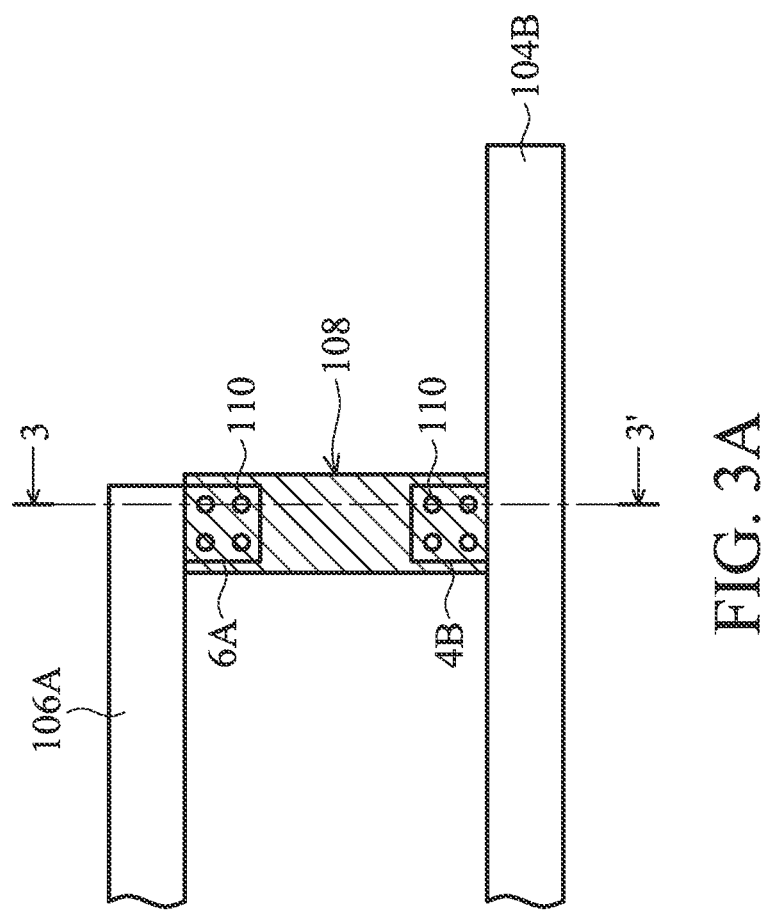
FIG. 3A shows an enlarged plane view at the circle area E of FIG. 1 according to an embodiment of the invention.

Referring to FIG. 3A, an enlarged plane view at the circle area E of FIG. 1 according to an embodiment of the invention is shown. As shown in FIG. 3A, the first gate line 104B and the second gate line 106A have extended portions 4B and 6A, independently. The extended portions 4B and 6A are disposed between the first gate line 104B and the second gate line 106A, and the extended portions 4B and 6A are aligned with each other. Via holes 110 in the insulating layer (not shown) are disposed on the extended portions 4B and 6A, and the first conductive pattern 108 is formed to cover the extended portions 4B and 6A.

Figure 3B:
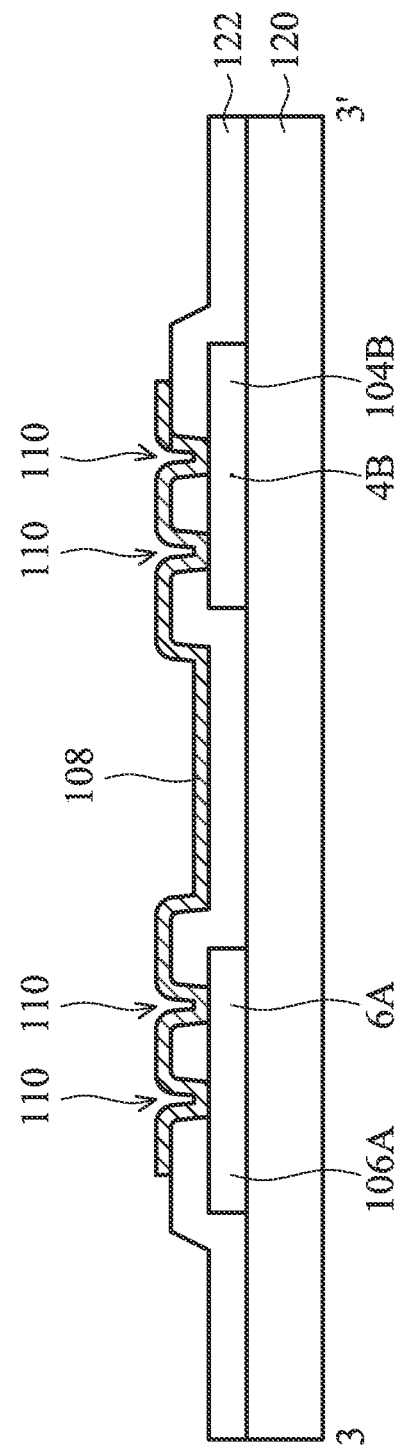
FIG. 3B shows a cross section of an array substrate of a display panel along the cross section line 3-3' of FIG. 3A according to an embodiment of the invention.

Then, referring to FIG. 3B, a cross section of the array substrate of the display panel 100 along the cross section line 3-3' of FIG. 3A according to an embodiment of the invention is shown. As shown in FIG. 3B, first, the first gate line 104B and the second gate line 106A are formed on a substrate 120. The first gate line 104B and the second gate line 106A can be formed by depositing a metal layer on the substrate 120 and then using a photolithography and etching process to pattern the metal layer. Meanwhile, a plurality of the first gate lines and the second gate lines are separated and electrically isolated from each other.

Next, an insulating layer 122 is formed to cover the first gate line 104B and the second gate line 106A. The material of the insulating layer 122 may be silicon oxides (SiOx), silicon nitrides (SiNx) or a combination thereof. Then, the via holes 110 are formed in the insulating layer 122 to expose the first gate line 104B and the second gate line 106A separately. As shown in FIG. 3A, the extended portions 4B and 6A of the first gate line 104B and the second gate line 106A have the via holes 110 formed thereon.

Then, the first conductive pattern 108 is formed on the insulating layer 122. Through the via holes 110, the first gate line 104B at a row of the pixels is electrically connected to the second gate line 106A at an adjacent row of the pixels, by the first conductive pattern 108. The material of the first conductive pattern 108 may be a transparent conductive material or a metal material. The transparent conductive material is for example indium tin oxide (ITO) or indium zinc oxide (IZO), which may be the material of a pixel electrode. Therefore, the first conductive pattern 108 may be formed by the process of forming the pixel electrode. The first conductive pattern 108 may be formed by the process of forming a metal layer of the display panel 100.

Figure 3C:
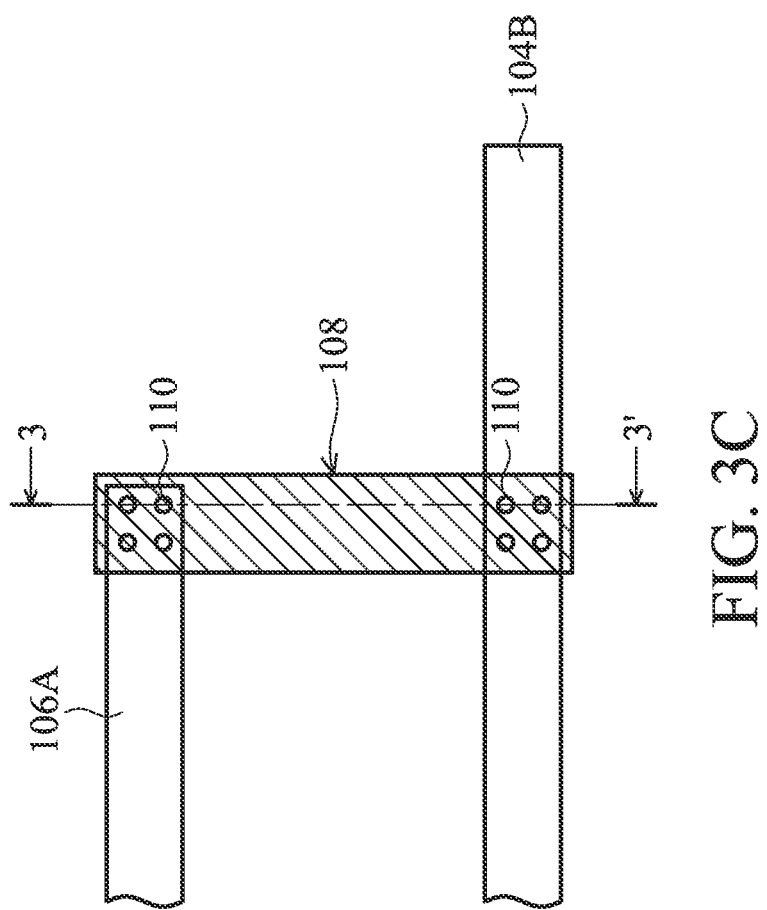
FIG. 3C shows an enlarged plane view at the circle area E of FIG. 1 according to an embodiment of the invention.

Referring to FIG. 3C, an enlarged plane view at the circle area E of FIG. 1 according to another embodiment of the invention is shown. As shown in FIG. 3C, there is no extended portion between the first gate line 104B and the second gate line 106A. The via holes 110 in the insulating layer (not shown) are directly disposed on the first gate line 104B and the second gate line 106A, and the first conductive pattern 108 is formed to cover the first gate line 104B and the second gate line 106A. Through the via holes 110, the first gate line 104B at a row of the pixels is electrically connected to the second gate line 106A at an adjacent row of the pixels, by the first conductive pattern 108.

Figure 3D:
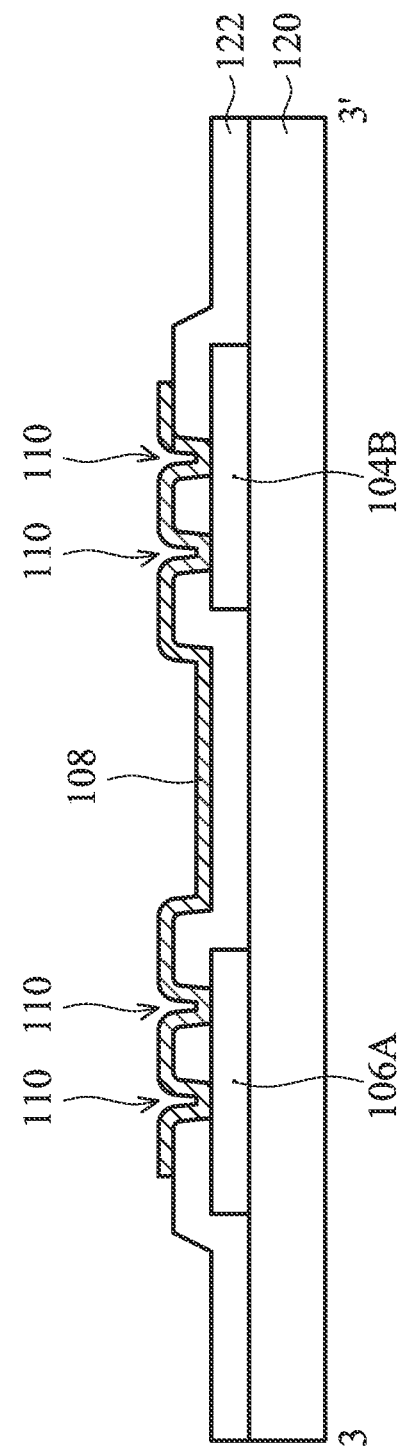
FIG. 3D shows a cross section of an array substrate of a display panel along the cross section line 3-3' of FIG. 3C according to an embodiment of the invention.

Next, referring to FIG. 3D, a cross section of an array substrate of the display panel 100 along the cross section line 3-3' of FIG. 3C according to an embodiment of the invention is shown. The difference between FIG. 3D and FIG. 3B is the locations of the via hole 110 in the insulating layer 122. In the embodiment of FIG. 3D, the via hole 110 are directly formed on the first gate line 104B and the second gate line 106A. In the embodiment of FIG. 3B, the via holes 110 are formed on the extended portion 4B of the first gate line 104B and the extended portion 6A of the second gate line 106A.

In subsequent embodiments, the first gate line 104B and the second gate line 106A have the extended portions therebetween. However, in other embodiments, the first gate line 104B and the second gate line 106A have no extended portions.

Referring to FIG. 4A, an enlarged plane view at the circle area E of FIG. 1 according to an embodiment of the invention is shown. As shown in FIG. 4A, the first gate line 104B and the second gate line 106A have extended portions 4B and 6A, independently. The extended portions 4B and 6A are parallel with each other. Via holes 110 in the insulating layer (not shown) are disposed on the extended portions 4B and 6A, and the first conductive pattern 108 is formed to cover the extended portions 4B and 6A. The difference between FIG. 4A and FIG. 3A is the pattern design of the extended portions 4B and 6A. The embodiment of FIG. 4A uses the pattern design of the extended portions 4B and 6A to increase a bridging area between the first gate line 104B and the second gate line 106A.

Figure 4B:
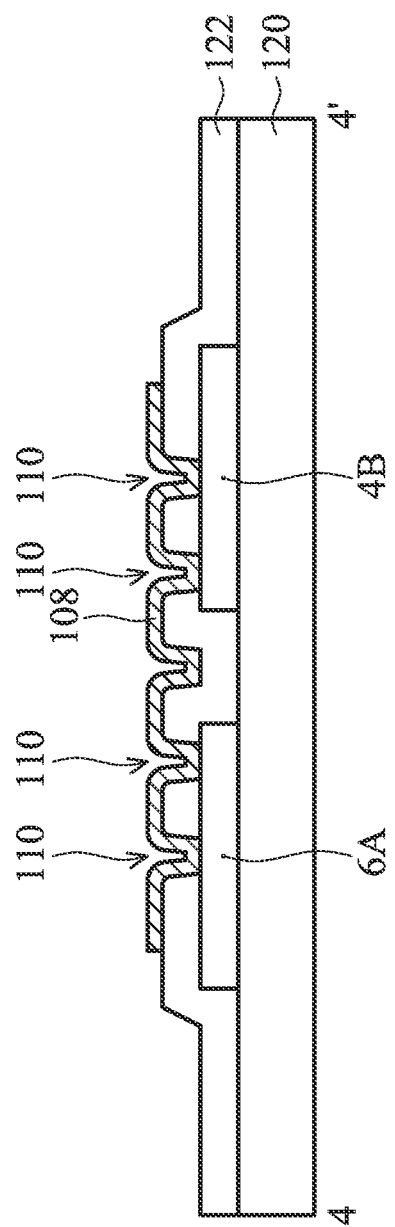
FIG. 4B shows a cross section of an array substrate of a display panel along the cross section line 4-4' of FIG. 4A according to an embodiment of the invention.

Next, referring to FIG. 4B, a cross section of an array substrate of the display panel 100 along the cross section line 4-4' of FIG. 4A according to an embodiment of the invention is shown. As shown in FIG. 4B, the first gate line 104B and the second gate line 106A are formed on a substrate 120. Meanwhile, a plurality of the first gate lines and the second gate lines formed on the substrate 120 are separated and electrically isolated from each other.

Next, an insulating layer 122 is formed to cover the first gate line 104B and the second gate line 106A. Then, the via holes 110 are formed in the insulating layer 122 to expose the first gate line 104B and the second gate line 106A separately.

Then, a first conductive pattern 108 is formed on the insulating layer 122. Through the via holes 110, the first gate line 104B at a row of the pixels is electrically connected to the second gate line 106A at an adjacent row of the pixels, by the first conductive pattern 108. Therefore, the first gate line 104B and the second gate line 106A receive the same gate signal. The material of the first conductive pattern 108 may be a transparent conductive material or a metal material. When the first conductive pattern 108 is formed from the transparent conductive material, the first conductive pattern 108 can be formed by the process of forming a pixel electrode.

Referring to FIG. 5A, an enlarged plane view at the circle area E of FIG. 1 according to an embodiment of the invention is shown. As shown in FIG. 5A, a second conductive pattern 112 is further disposed between the extended portion 4B of the first gate line 104B and the extended portion 6A of the second gate line 106A. The second conductive pattern 112 does not overlap the extended portion 4B of the first gate line 104B and the extended portion 6A of the second gate line 106A. The second conductive pattern 112 is separated from the extended portion 4B of the first gate line 104B and the extended portion 6A of the second gate line 106A with a gap. The material of the second conductive pattern 112 may be a transparent conductive material or a metal material. The transparent conductive material is for example InGaZnO (IGZO). Via holes 110 and 114 in an insulating layer (not shown) are disposed on the extended portions 4B and 6A and the second conductive pattern 112, separately. A first conductive pattern 108 is formed to cover the extended portions 4B and 6A and the second conductive pattern 112 for bridging. The difference between FIG. 5A and FIG. 3A is the second conductive pattern 112 disposed between the first gate line 104B and the second gate line 106A. The second conductive pattern 112 can reduce a bridging resistance between the first gate line 104B and the second gate line 106A.

Figure 5B:
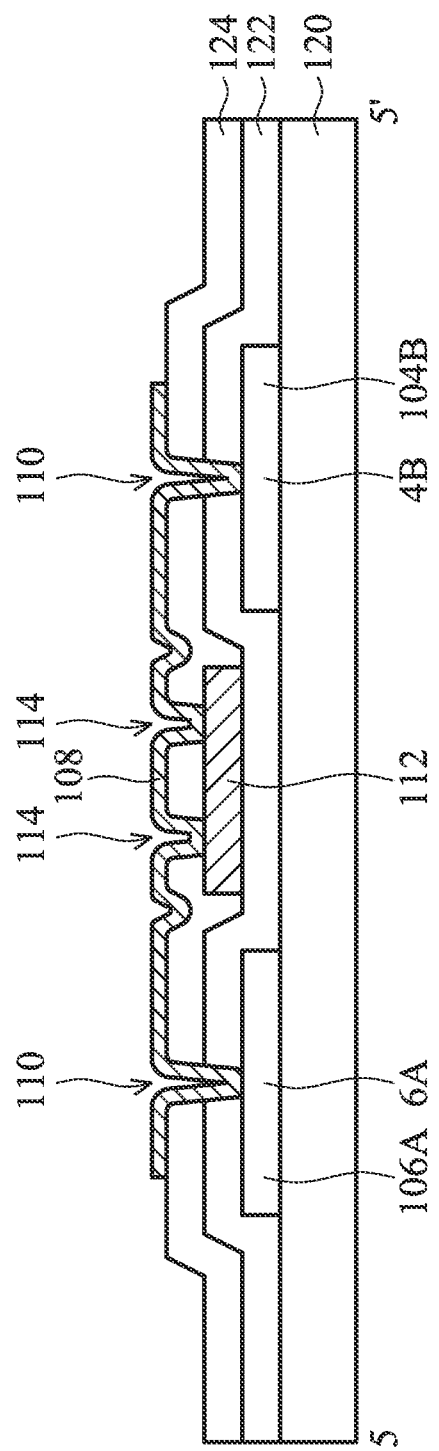
FIG. 5B shows a cross section of an array substrate of a display panel along the cross section line 5-5' of FIG. 5A according to an embodiment of the invention.

Next, referring to FIG. 5B, a cross section of an array substrate of the display panel 100 along the cross section line 5-5' of FIG. 5A according to an embodiment of the invention is shown. As shown in FIG. 5B, first, the first gate line 104B and the second gate line 106A are formed on a substrate 120. Meanwhile, a plurality of the first gate lines and the second gate lines formed on the substrate 120 are separated and electrically isolated from each other.

Next, an insulating layer 122 is formed to cover the first gate line 104B and the second gate line 106A. Then, the second conductive pattern 112 is formed on the insulating layer 122. The second conductive pattern 112 is located between the first gate line 104B and the second gate line 106A. The second conductive pattern 112 can be formed by a process of forming a metal layer of the display panel 100. Next, an insulating layer 124 is formed to cover the second conductive pattern 112, the first gate line 104B and the second gate line 106A. The materials of the insulating layers 122 and 124 may be silicon oxides (SiOx), silicon nitrides (SiNx) or a combination thereof.

The via holes 110 are formed in the insulating layers 122 and 124 to expose the first gate line 104B and the second gate line 106A. Furthermore, the via holes 114 are formed in the insulating layer 124 to expose the second conductive pattern 112. In order to simplify the drawing, only one via hole 110 and one via hole 114 are shown on the first gate line 104B, the second gate line 106A and the second conductive pattern 112 of FIG. 5B, separately.

Then, a first conductive pattern 108 is formed on the insulating layer 124. Through the via holes 110 and 114, the first gate line 104B, the second conductive pattern 112, and the second gate line 106A are electrically connected together by the first conductive pattern 108. The material of the first conductive pattern 108 may be a transparent conductive material or a metal material. When the first conductive pattern 108 is formed from the transparent conductive material, the first conductive pattern 108 can be formed by the process of forming a pixel electrode.

Referring to FIG. 6A, an enlarged plane view at the circle area E of FIG. 1 according to an embodiment of the invention is shown. As shown in FIG. 6A, a second conductive pattern 112 is further disposed between the extended portion 4B of the first gate line 104B and the extended portion 6A of the second gate line 106A. The second conductive pattern 112 overlaps the extended portion 4B of the first gate line 104B and the extended portion 6A of the second gate line 106A. The material of the second conductive pattern 112 is for example a metal material.

Via holes 110 and 114 in an insulating layer (not shown) are disposed on the extended portions 4B and 6A and the second conductive pattern 112, separately. A first conductive pattern 108 is formed to cover the extended portions 4B and 6A and the second conductive pattern 112 for bridging. The difference between FIG. 6A and FIG. 5A is the second conductive pattern 112 overlapping the first gate line 104B and the second gate line 106A. When the conductive pattern 108 for electrically connecting the first gate line 104B to the second gate line 106A fails, a laser beam may be used to irradiate the overlapped portions between the second conductive pattern 112 and the first gate line 104B and the second gate line 106A for producing a melted bond at the overlapped portions. Thus, the first gate line 104B is electrically connected to the second gate line 106A by the second conductive pattern 112 and the production yield of the display panel is further enhanced by the design of the second conductive pattern 112.

Figure 6B:
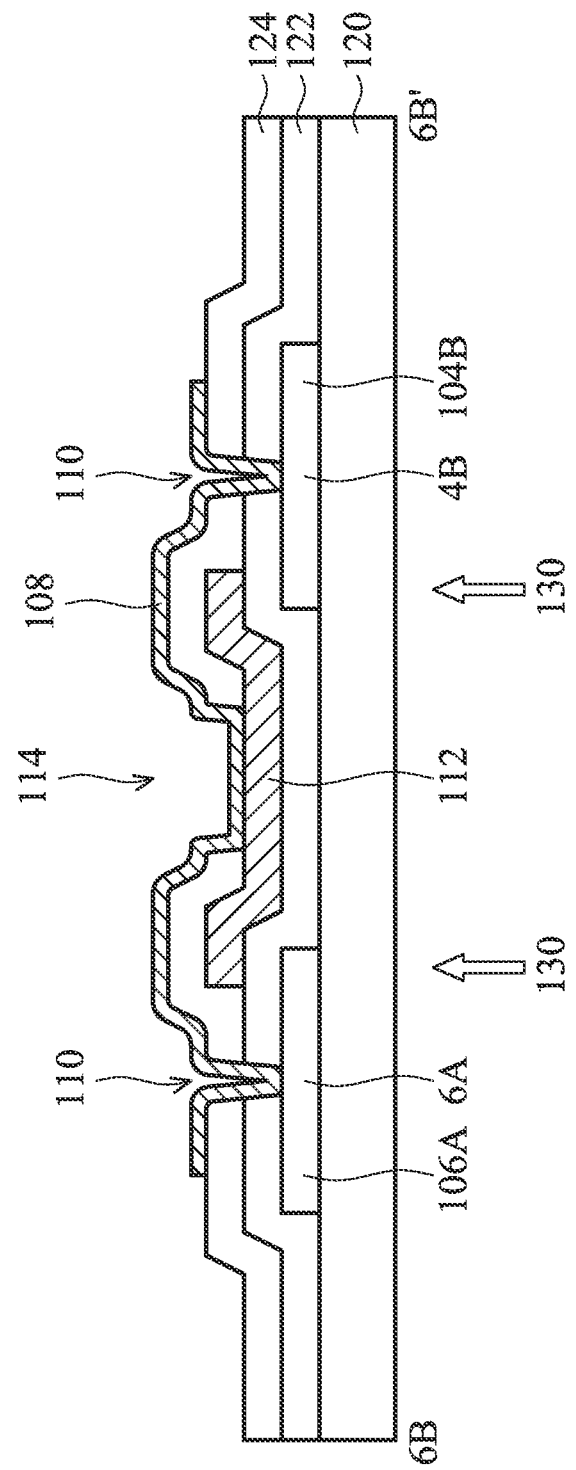
FIG. 6B shows a cross section of an array substrate of a display panel along the cross section line 6B-6B' of FIG. 6A according to an embodiment of the invention.

Next, referring to FIG. 6B, a cross section of an array substrate of the display panel 100 along the cross section line 6B-6B' of FIG. 6A according to an embodiment of the invention is shown. As shown in FIG. 6B, the first gate line 104B and the second gate line 106A are formed on a substrate 120. Meanwhile, a plurality of the first gate lines and the second gate lines formed on the substrate 120 are separated and electrically isolated from each other.

Then, an insulating layer 122 is formed to cover the first gate line 104B and the second gate line 106A. Next, the second conductive pattern 112 is formed on the insulating layer 122. The second conductive pattern 112 is located between the first gate line 104B and the second gate line 106A. Furthermore, the second conductive pattern 112 overlaps the first gate line 104B and the second gate line 106A. Then, an insulating layer 124 is formed to cover the second conductive pattern 112, the first gate line 104B and the second gate line 106A.

The via holes 110 are formed in the insulating layers 122 and 124 to expose the first gate line 104B and the second gate line 106A. Furthermore, the via holes 114 are formed in the insulating layer 124 to expose the second conductive pattern 112. The length of the via hole 114 is about more than 50% of the length of the second conductive pattern 112. In order to simplify the drawing, only one via hole 110 and one via hole 114 are shown on the first gate line 104B, the second gate line 106A and the second conductive pattern 112 of FIG. 6B, separately.

Then, a first conductive pattern 108 is formed on the insulating layer 124. Through the via holes 110 and 114, the first gate line 104B, the second conductive pattern 112, and the second gate line 106A are electrically connected together by the first conductive pattern 108. The material of the first conductive pattern 108 may be a transparent conductive material or a metal material. When the first conductive pattern 108 is formed from the transparent conductive material, the first conductive pattern 108 can be formed by the process of forming a pixel electrode.

When the conductive pattern 108 for electrically connecting the first gate line 104B to the second gate line 106A fails, a laser beam irradiating process 130 may be performed from the side of the substrate 120 to irradiate the overlapped portions between the second conductive pattern 112 and the first gate line 104B and the second gate line 106A for producing a melted bond at the overlapped portions. Thus, the first gate line 104B is electrically connected to the second gate line 106A by the second conductive pattern 112.

Figure 6C:
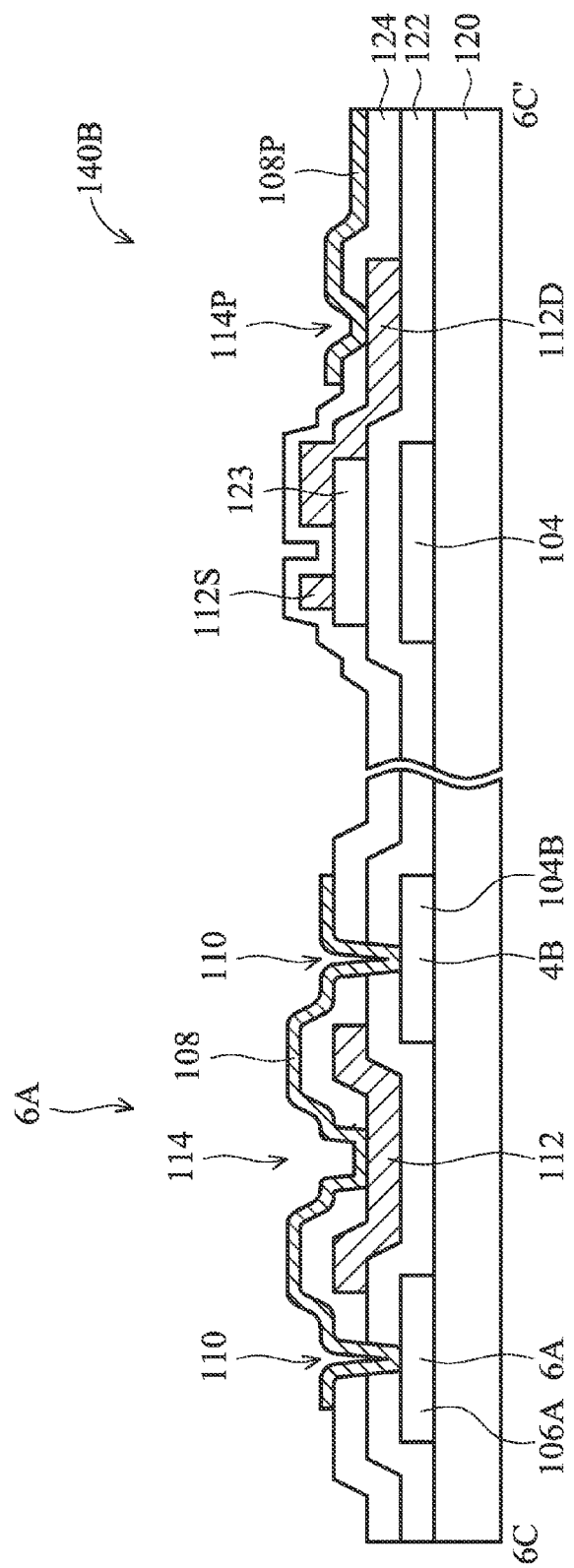
FIG. 6C shows a cross section of an array substrate of a display panel including a thin-film transistor along the cross section line 6C-6C' of FIG. 1 according to an embodiment of the invention.

Referring to FIG. 6C, a cross section of an array substrate of a display panel including a driving thin-film transistor 140B along the cross section line 6C-6C' of FIG. 1 according to an embodiment of the invention is shown. In FIG. 6C, an electrical connection structure 6A for the first gate line 104B and the second gate line 106A is illustrated by the embodiment of FIG. 6B as an example and not repeated again. However, the electrical connection structure 6A of FIG. 6C can also be replaced by the above mentioned embodiments for electrically connecting the first gate line 104B and the second gate line 106A. As shown in FIG. 6C, the driving thin-film transistor 140B includes a gate 104 formed on the substrate 120. The insulating layer 122 is formed to cover the gate 104. A semiconductor layer 123 is formed on the insulating layer 122. A source 112S and a drain 112D are formed on the semiconductor layer 123. The insulating layer 124 is formed to cover the source 112S and the drain 112D. A via hole 114P is formed in the insulating layer 124 to expose a portion of the drain 112D. A pixel electrode 108P is formed on the insulating layer 124 and electrically connected to the drain 112D through the via hole 114P.

According to the embodiments of the invention, the second conductive pattern 112, the source 112S and the drain 112D can be formed simultaneously by the same process. The via holes 110, 114 and 114P also can be formed simultaneously by the same process. Furthermore, the pixel electrode 108P and the first conductive pattern 108 also can be formed simultaneously by the same process. Therefore, in the embodiments of the invention, the electrical connection structure for electrically connecting the first gate line at each row of the pixels to the second gate line at an adjacent row of the pixels can be formed by the processes of forming the driving thin-film transistor and the step-down thin film transistor. Compared with the conventional process of forming a thin-film transistor, the embodiments of the invention are completed without added processes and only changes in the pattern design of masks are required. The fabrication processes of the embodiments of the invention are compatible with the fabrication processes of conventional display panels. The embodiments of the invention can ensure that no open issue occurs at the first gate lines and the second gate lines. Thus, the production yield of the display panels according to the embodiments of the invention is enhanced.

An embodiment of the display panel 100 further includes a color filter substrate disposed opposite to the array substrate and a liquid crystal layer sandwiched between the color filter substrate and the array substrate. Moreover, the display panel 100 further includes a pair of polarizers disposed on the outer sides of the color filter substrate and the array substrate respectively to complete the fabrication of a liquid crystal display panel.

In summary, before assembling the liquid crystal display panel, the fabrication method of the embodiment of the invention can check out the first and the second gate lines and find the open and/or short issue in the first and the second gate lines to repair. Then, the first gate line at each row of the pixels is electrically connected to the second gate line at an adjacent row of the pixels, by the first conductive pattern. The first conductive pattern can be formed by the process of forming a pixel electrode and does not require an added process for completion. Thus, according to the embodiments of the invention, the scrapped rate of the liquid crystal display panels is effectively reduced and the production yield thereof is enhanced.

Figure 7:
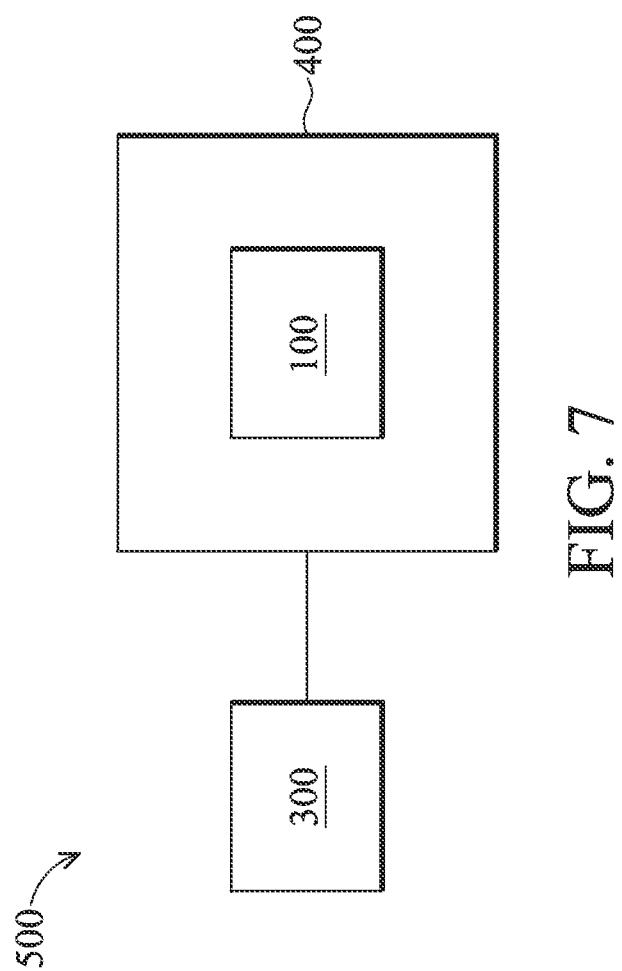
FIG. 7 schematically shows a system for displaying images including the display panel according to an embodiment of the invention.

Next, referring to FIG. 7, a system 500 for displaying images according to an embodiment of the invention is shown. The system 500 for displaying images includes a display 400, for example a liquid crystal display. The display 400 includes a display panel 100 according to an embodiment of the invention. The display 400 can be a part of an electronic device. In general, the system 500 for displaying images includes the display 400 and a control unit 300. The control unit 300 is coupled with the display 400 to provide input to the display 400, such that the display 400 displays images. The above mentioned electronic device can be a mobile phone, a digital camera, a personal data assistant (PDA), a notebook computer, a desktop computer, a television, a car display or a portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating a system for displaying images, including forming a display panel, having a plurality of pixels, the method comprising:
    forming a first gate line and a second gate line at each row of the pixels, wherein each of the first gate lines and each of the second gate lines are separated and electrically isolated from each other, and the first gate line and the second gate line at each row of the pixels are two parallel gate lines;
    forming a first insulating layer, covering the first gate lines and the second gate lines;
    forming a plurality of via holes in the first insulating layer to expose the first gate lines and the second gate lines; and
    forming a first conductive pattern on the first insulating layer, wherein the first gate line at each row of the pixels is electrically connected to the second gate line at an adjacent row of the pixels, by the first conductive pattern, through the via holes.

2. The method as claimed in claim 1, further comprising:
    forming a second conductive pattern between the first insulating layer and the first conductive pattern, wherein the second conductive pattern is located between the first gate line and the second gate line;
    forming a second insulating layer between the second conductive pattern and the first conductive pattern; and
    forming a plurality of via holes in the second insulating layer to expose the first gate lines, the second conductive pattern and the second gate lines separately,
    wherein the first gate line at the each row of the pixels is electrically connected to the second gate line at the adjacent row of the pixels and the second conductive pattern by the first conductive pattern, through the via holes in the first insulating layer and the via holes in the second insulating layer.

3. The method as claimed in claim 2, wherein the second conductive pattern is separated from the first gate line and the second gate line with a gap or partially overlaps the first gate line and the second gate line.

4. The method as claimed in claim 3, wherein the second conductive pattern partially overlaps the first gate line and the second gate line, and a laser beam is used to irradiate the overlapped portions between the second conductive pattern and the first gate line and the second gate line, wherein due to the laser beam, the second conductive pattern is electrically connected with the first gate line and the second gate line.

5. The method as claimed in claim 2, wherein the second insulating layer comprises one or more than one via hole formed therein to expose the second conductive pattern.

6. The method as claimed in claim 5, wherein the second insulating layer only has one via hole to expose the second conductive pattern, and the one via hole has a length which is longer than 50% of the length of the second conductive pattern.

7. The method as claimed in claim 2, wherein the materials of the first and the second conductive patterns comprise a transparent conductive material or a metal material.

8. The method as claimed in claim 1, wherein the first gate line and the second gate line separately have an extended portion between the first gate line and the second gate line, and the via holes in the first insulating layer are formed on the extended portions of the first gate line and the second gate line.

9. The method as claimed in claim 8, wherein the extended portion of the first gate line is aligned with or parallel to the extended portion of the second gate line.

10. The method as claimed in claim 1, wherein the via holes in the first insulating layer are directly formed on the first gate line and the second gate line.

11. A system for displaying images, comprising:
    a display panel, having a plurality of pixels, the display panel comprising:
        a first gate line and a second gate line disposed at each row of the pixels, wherein each of the first gate lines and each of the second gate lines are separated from each other, and the first gate line and the second gate line at each row of the pixels are two parallel gate lines;
        a first insulating layer disposed over the first gate lines and the second gate lines;
        a plurality of via holes disposed in the first insulating layer to expose the first gate lines and the second gate lines separately; and
        a first conductive pattern disposed on the first insulating layer, wherein the first gate line at each row of the pixels is electrically connected to the second gate line at an adjacent row of the pixels, by the first conductive pattern, through the via holes.

12. The system as claimed in claim 11, further comprising:
    a second conductive pattern disposed between the first insulating layer and the first conductive pattern, wherein the second conductive pattern is located between the first gate line and the second gate line;
    a second insulating layer disposed between the second conductive pattern and the first conductive pattern; and
    a plurality of via holes disposed in the second insulating layer to expose the first gate lines, the second conductive pattern and the second gate lines separately,
    wherein the first gate line at the each row of the pixels is electrically connected to the second gate line at the adjacent row of the pixels and the second conductive pattern by the first conductive pattern, through the via holes in the first insulating layer and the via holes in the second insulating layer.

13. The system as claimed in claim 12, wherein the second conductive pattern is separated from the first gate line and the second gate line with a gap or partially overlaps the first gate line and the second gate line.

14. The system as claimed in claim 12, wherein the second insulating layer comprises one or more than one via hole formed therein to expose the second conductive pattern.

15. The system as claimed in claim 14, wherein the second insulating layer only has one via hole to expose the second conductive pattern, and the one via hole has a length which is longer than 50% of the length of the second conductive pattern.

16. The system as claimed in claim 11, wherein the materials of the first and the second gate lines comprise a metal material.

17. The system as claimed in claim 12, wherein the materials of the first and the second conductive patterns comprise a transparent conductive material or a metal material.

18. The system as claimed in claim 11, wherein the first gate line and the second gate line separately have an extended portion between the first gate line and the second gate line, and the via holes in the first insulating layer are disposed on the extended portion of the first gate line and the extended portion of the second gate line, wherein the extended portion of the first gate line is aligned with or parallel to the extended portion of the second gate line.

19. The system as claimed in claim 11, wherein the via holes in the first insulating layer are directly disposed on the first gate line and the second gate line.

20. The system as claimed in claim 11, further comprising an electronic device, wherein the electronic device comprises:

a display, including the display panel; and a control unit coupled to the display to provide input to the display such that the display displays images.

* * * * *